C. A. GIFFORD.
COUPLING DEVICE OR CLASP.
APPLICATION FILED APR. 10, 1911.

1,024,566.

Patented Apr. 30, 1912.

WITNESSES:
Fredk H. W. Fraentzel
Harry E. Pfiffer

INVENTOR:
Charles A. Gifford,
BY
Fraentzel and Richards,
ATTORNEYS

COLUMBIA PLANOGRAPH CO., WASHINGTON, D. C.

UNITED STATES PATENT OFFICE.

CHARLES A. GIFFORD, OF NEWARK, NEW JERSEY.

COUPLING DEVICE OR CLASP.

1,024,566. Specification of Letters Patent. Patented Apr. 30, 1912.

Application filed April 10, 1911. Serial No. 620,201.

*To all whom it may concern:*

Be it known that I, CHARLES A. GIFFORD, a citizen of the United States, residing at Newark, in the county of Essex and State of New Jersey, have invented certain new and useful Improvements in Coupling Devices or Clasps; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in holding devices of various kinds, such as catches, clasps, couplings, door-stops, and many other devices, wherein it is desirable to hold together, temporarily two separable parts or devices; and, the invention has reference, more particularly, to a simple, strong, cheap, and efficient construction of holding device which may be applied to various uses.

The invention has for its principal object to provide a novel construction of holding device of very few parts, the device being simple in its operation, being strong and durable, and of very efficient holding power, and the device being furthermore adapted to be applied to many types of couplings, catches, and the like, to serve many purposes.

A further object of the present invention is to provide a holding device of the character herein-above set forth, which operates in connecting or disconnecting the same in or from its holding relation without the use of manually manipulated means or manipulation, other than the mere pressing together or pulling apart of the parts desired to be held together.

Other objects of this invention not at this time more particularly enumerated will be clearly evident from the following detailed description of the same.

With the various objects of the present invention in view, the said invention consists, primarily, in the novel holding device hereinafter more fully set forth; and, the said invention consists, furthermore, in the novel arrangements and combinations of the various parts comprising the said holding device, all of which will be hereinafter more fully described, and then finally embodied in the clauses of the claim which is appended to and which forms an essential part of the specification.

The invention is clearly illustrated in the accompanying drawings, in which:—

Figure 1:
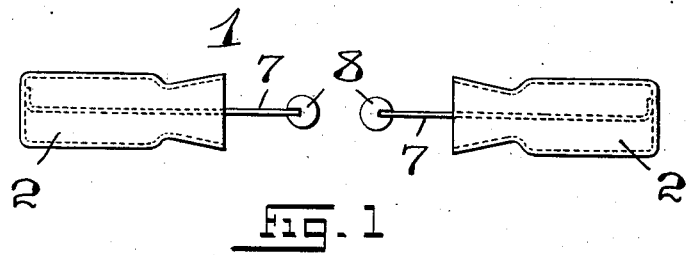
Figure 2:
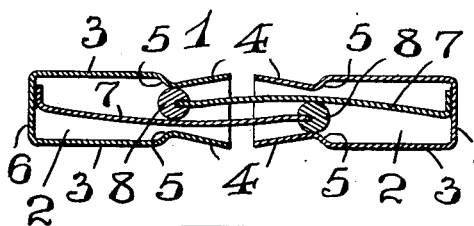
Figure 3:
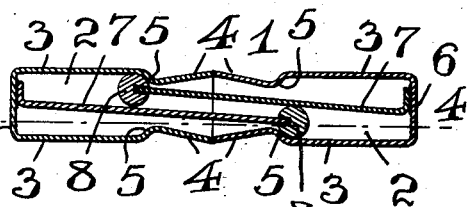
Figure 4:
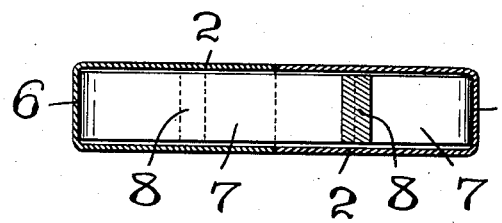
Figure 5:
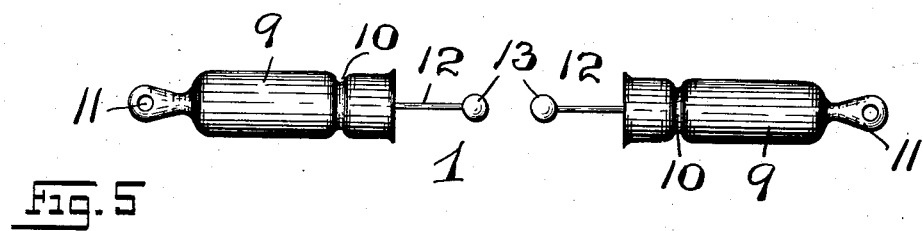
Figure 6:
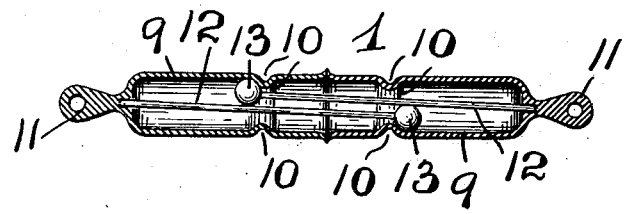

Figure 1 is a plan view of a holding device made according to and embodying the principles of my present invention, the same being shown in its separated or disconnected condition. Fig. 2 is a horizontal section of the same, illustrating its action as the separated parts are caused to assume their joined or holding relation, one with the other; Fig. 3 is a similar sectional representation of the coupling, showing the parts thereof in their completely joined or holding relation, one with the other; and Fig. 4 is a vertical section of the same, said section being taken on line 4—4 in said Fig. 3. Fig. 5 is a plan view of a slightly modified construction of holding device embodying the principles of the present invention, the parts thereof being shown in their separated or disconnected relation; and Fig. 6 is a horizontal section of the same with its parts in their joined or holding relation one with the other.

Similar characters of reference are employed in all of the herein above described views, to indicate corresponding parts.

Referring now to the said drawings, the reference-character 1 indicates the complete holding device made according to and embodying the principles of the present invention, said device comprising a pair of hollow body-portions 2, open at one end. The side-walls 3 of said hollow body-portions 2 are formed with inwardly inclined portions 4 extending inwardly from the open ends of said hollow body-portions, said inclined portions 4 terminating within said hollow body-portions in oppositely disposed ribs or nosings 5. Secured in any suitable manner to the inner sides of the end-walls 6 of said hollow body-portion 2 are outwardly extending spring-like arms 7, the same projecting beyond the open ends of said hollow body-portions 2. Secured in any suitable manner to the free ends of said spring-like arms 7 are lock-bars 8, the same being preferably of cylindrical form, although other shapes may be used, if desired. The said spring-like arms 7 extend in a central location and longitudinally of the said hollow body-portions 2, the same lying, normally, midway between said oppositely disposed or facing ribs or nosings 5 formed in the side-walls 3 of said hollow body-portions. The said holding devices, as thus constructed and arranged, are adapted to be used in pairs, operating conjointly one with another. The said hollow body-portions may be integrally formed with the parts or things desired to be temporarily connected together by said holding devices; or, the same may be arranged to be attached to said parts or things in any other desirable manner, as will be clearly evident.

The manner of operating a pair of said holding devices, so as to cause the same to perform their holding or connecting functions is as follows: The said body-portions 2 are placed with their open ends facing each other, and the lock-bar 8 of one body-portion is caused to pass the lock-bar of the opposite body-portion and enter the open end thereof. The said body-portions 2 being thus moved toward each other, the respective lock-bars 8 move into engagement with one side-wall and the respective spring-like arm 7 of the oppositely placed body-portions 2, so as to cause the said lock-bars to pass over one of said ribs or nosings 5. The space between the ribs or nosings 5 and the spring-like arms 7 being less than the diameter of said lock-bars 8, the said spring-like arms 7 are caused to yield to the passage of said lock-bars 8, in the manner shown in Fig. 2 of the accompanying drawings. When, however, the said lock-bars 8 pass the said ribs or nosings 5, they spring behind the same, and said spring-like arms 7 resume their normal initial form, thereby tending to press and maintain the said lock-bars 8 in their holding engagement with the respective ribs or nosings 5. At the same time, the open ends of the said body-portions 2 are at that movement caused to abut or register with each other, in the manner shown in Fig. 3 of the drawings, whereupon the holding devices are caused to perform their holding function. The purpose of providing ribs or nosings 5 upon each side of the said body-portions 2 is to accommodate said lock-bars 8 in locking position, no matter which side of the opposite spring-like arm 7 the lock-bar passes and engages with when the same are pressed together. It will also be evident, that there are no lefts or rights as to the construction of the separable locking devices, but that all the engaging parts are constructed alike and may be caused to contact with any other similarly constructed fellow device. Of course, if it is so desired, the holding devices can be made so as to provide left and right body-portions 2, with but a single nosing. as will be clearly understood, therefore, I do not wish to be understood as limiting my invention to the general form and type shown in the accompanying drawings.

Referring now to Figs. 5 and 6 of the accompanying drawings, I have shown therein a slightly modified form of holding device which, however, still embodies and is made according to the general principles of the present invention. In this construction, I provide a pair of hollow body-portions 9, preferably of tubular conformation, and open at one end. The walls of said body-portion 9 are formed to provide inwardly projecting annular ribs or nosings 10, located at convenient and proper distances from the open ends of said body-portions. The closed ends of the body-portions 9 may be provided with eyelet-like or ring-shaped portions 11, if so desired, for the attachment of said holding devices to the parts or things desired to be joined together; or, any other suitable means for such purpose may be provided. Secured within the closed end of each body-portion 9 is a centrally disposed and outwardly extending spring-like shank or arm 12 which projects beyond the said open end of the body-portion, and secured, in any suitable manner, to the free end of said spring-like shank or arm 12 is a lock-piece 13, the same being preferably made in the shape of a sphere or ball, as shown, but which can be made in other shape, such as a disk or cone, or the like, if so desired. The manner of use and operation of this modified construction of locking device is substantially the same in every particular, as is above described in connection with the main construction of locking device.

It will be clearly evident, that my present invention provides an exceedingly simple, cheap and efficient holding device, the same being made of very few parts, little disposed to be injured or broken, or to become disarranged, thus providing a device which requires no especial manipulation to connect or disconnect the parts thereof, other than the mere pushing together or pulling apart of the separable parts thereof.

I am aware that changes may be made in the various arrangements and combinations of the several parts, as well as in the details of the construction of the same, without departing from the scope of my present invention, as set forth in the foregoing specification, and as defined in the claims appended thereto. Hence, I do not limit my invention to the exact arrangements and combinations of the parts as herein described in the said specification nor do I confine myself to the exact details of the construction of the said parts, as illustrated in the accompanying drawings.

I claim:—

1. A holding device or catch comprising separable hollow body-portions open at one end, a spring-like arm within each hollow body-portion, each spring-like arm having a portion projecting beyond the open end of the hollow body-portion in which it is arranged, a retaining nosing within the interior of each body-portion, and means upon the projecting end-portion of said spring-like arms adapted to be brought into holding engagement with the said retaining nosings when the said hollow body-portions are caused to assume their interconnected or holding relations, substantially as and for the purposes set forth.

2. A holding device or catch comprising separable hollow body-portions open at one end, a centrally disposed longitudinally extending spring-like arm secured within the interior of each body-portion and projecting beyond the open end thereof, a rib or nosing within the interior of each hollow body-portion, and a lock-piece or bar connected with the free end of each spring-like arm, said lock-pieces or bars engaging said ribs or nosings of the opposed body-portions, and said lock-pieces or bars being maintained in such engagement by their respectively opposite spring-like arms, substantially as and for the purposes set forth.

In testimony, that I claim the invention set forth above I have hereunto set my hand this 6th day of April, 1911.

CHARLES A. GIFFORD.

Witnesses:
WM. C. PRICE,
P. L. DRUM.

Copies of this patent may be obtained for five cents each, by addressing the "Commissioner of Patents Washington, D. C."